United States Patent
Schäfer et al.

(10) Patent No.: US 8,980,957 B2
(45) Date of Patent: Mar. 17, 2015

(54) METHODS FOR THE PREPARATION OF BIOCOMPATIBLE POLYMERS, THE POLYMERS AND THEIR USES

(75) Inventors: Rolf Schäfer, Arisdorf (CH); Hans Hitz, Arisdorf (CH)

(73) Assignee: CIS Pharma AG, Bubendorf (CH)

( * ) Notice: Subject to any disclaimer, the term of this patent is extended or adjusted under 35 U.S.C. 154(b) by 296 days.

(21) Appl. No.: 13/261,345

(22) PCT Filed: Jan. 11, 2011

(86) PCT No.: PCT/EP2011/000129
§ 371 (c)(1),
(2), (4) Date: Jun. 29, 2012

(87) PCT Pub. No.: WO2011/085988
PCT Pub. Date: Jul. 21, 2011

(65) Prior Publication Data
US 2012/0329902 A1    Dec. 27, 2012

Related U.S. Application Data

(60) Provisional application No. 61/282,287, filed on Jan. 14, 2010.

(51) Int. Cl.
| | |
|---|---|
| *A61K 47/32* | (2006.01) |
| *A61K 47/30* | (2006.01) |
| *G02B 1/04* | (2006.01) |
| *C08F 8/30* | (2006.01) |

(52) U.S. Cl.
CPC . *G02B 1/043* (2013.01); *C08F 8/30* (2013.01); *Y10S 514/912* (2013.01)
USPC .................. 514/772.5; 514/772.1; 514/772.3; 514/772.4; 514/783; 514/912; 524/106; 524/104; 524/237; 524/238; 264/1.1; 264/2.6

(58) Field of Classification Search
USPC ........... 264/2.6, 1.1; 514/772.1, 772.4, 772.3, 514/772.5, 783, 912; 524/106, 237, 238
See application file for complete search history.

(56) References Cited

U.S. PATENT DOCUMENTS 4,010,254 A * 3/1977 Koulbanis et al. ......... 514/772.5
6,695,880 B1    2/2004 Roffman et al.

FOREIGN PATENT DOCUMENTS

JP        S54-084397        7/1979
WO       WO2006/126095    11/2006

OTHER PUBLICATIONS

Ivanova et al. Poly (L-lyine)-mediated immobilsation of oligonucleotides on carboxy-rick polymer surfaces. Biosensors and Bioelectronics 19(2004), 1363-1370.*
Samojlova et al. (2004) Use of affinity chromatography principle in creating new thromboresistant materials. J. Chromatogr. B 800, 263-9.
Samojlova et al. (2004) Use of affinity chromatography principle in creatin new thromboresistant materials. J.Chromatogr. B800, 263-9.
Ivanova et al. (2004) Poly(L-lysine)-mediated immobilisation of oligonucleotides on carboxy-rich polymer surfaces. Biosensors & Bioelectronics 19: 1363-70.
Conix, A. (1955) Ring opening in lactam polymers. J. Polymer Sciences 15: 221-9.

* cited by examiner

*Primary Examiner* — Sanza McClendon
(74) *Attorney, Agent, or Firm* — Richard Voellmy

(57) ABSTRACT

The subject invention relates to a method of preparing a biocompatible polymer comprising epsilon-linked L-lysine having free alpha-amino and carboxy functions. The invention further encompasses the resulting biocompatible polymer and articles made from the polymer, in particular contact and intraocular lenses.

21 Claims, No Drawings

METHODS FOR THE PREPARATION OF BIOCOMPATIBLE POLYMERS, THE POLYMERS AND THEIR USES

The present application is a national phase of international patent application PCT/EP2011/000129 designating the United States, filed on Jan.11, 2011, which international application claims priority from U.S. provisional application Ser. No. 61/282,287, filed on Jan. 14, 2010.

FIELD OF THE INVENTION

The subject application relates to a method for the preparation of new biocompatible polymers comprising epsilon-linked L-lysine, to these polymers as well as their uses, in particular for the manufacture of contact and intraocular lenses.

BACKGROUND OF THE INVENTION

Synthetic polymers are widely used in biomedical applications as well as in other articles that come into contact with human skin or tissues, including clothing. Polymers frequently used in biomedical applications include acrylics, polyurethanes, silicones and various hydrophilics. In the area of optical lenses, including intraocular and contact lenses, typically used polymers are polymethylmethacrylate, polyphenylethyl methacrylate, cellulose acetate butyrate, silicone-methylmethacrylate co-polymers, methylmethacrylate co-polymers with hydrophilic compounds, as well as hydrogels such as those based on hydroxyethylmethacrylate and dihydroxypropylmethacrylate. Silicone-containing hydrogels have been prepared by co-polymerization of silicone monomers such as methacryloxy propyl tris(tri-methylsiloxy)silane (TRIS) and/or siloxane macromere, and hydrophilic monomers such as N,N-dimethylacrylamide, N-vinyl pyrrolidone, N-carboxyvinyl ester, etc. Common to these materials is that they provide for surfaces that are very different from known biological surfaces and therefore exhibit various degrees of tissue or bio-incompatibility. Incorporation of amino acids into polymers intended for contact with biological surfaces may enhance their biocompatibility. Bawa described polymers including amino acids in U.S. Pat. No. 4,668,506. However, because the amino acids contained in the polymers of Bawa lack free alpha-amino-carboxy groups, they do not significantly improve the biocompatibility of polymers. Hitz et al. described in international publication WO 2006126095 polymers resulting from co-polymerization of side chain-active acrylic amino acids and conventional acrylic monomers. These polymers that contain amino acids with free alpha-amino-carboxy groups were shown to have a dramatically increased biocompatibility when compared to prior art polymers. Because the amino acids residues incorporated in the polymers are not linked via peptidic bonds, the polymers are resistant to biological degradation by tissue proteases and may give rise to reduced hematological responses. Furthermore, the presence of amino acid residues in the polymers increases their hydrophilicity. Depending on the nature of a polymer, this may translate into enhanced uptake of water, oxygen permeability and surface wetting.

The present invention relates to a novel method for preparing polymers of related character. The method is far simpler and economically more feasible than the methods described in publication WO 2006126095. Furthermore, existing manufacturing procedures for hard lenses as well as hydrogel lenses can be adapted with minimal effort and cost for the production of products containing the new, biocompatible polymers. Chemically, the polymers of the subject invention are related with but are not identical with the closest prior art polymers. The polymers of the present invention contain 2,3-linked (substituted or unsubstituted) succinyl-epsilon-lysinylamide monomers, whereas the closest prior art polymers include 1,2-linked, 2-methylated or unsubstituted, propionyl-epsilon-lysinylamide monomers. On a functional level, the new polymers contain extra negative charges at neutral pH, which charges may play an important biological function in reducing interactions with proteins and other negatively charged molecules present on the biological surface with which the polymers come into contact.

SUMMARY OF THE INVENTION

The present invention relates to a method of preparing a biocompatible polymer comprising epsilon-linked L-lysine having a free alpha-amino carboxy function. This method comprises the steps of (a) preparing a polymerization mixture comprising at least two monomers, of which the first monomer is maleic acid anhydride, 2-methylated maleic acid anhydride or 2,3-dimethylated maleic acid and the second or further monomer is a different monomer having at least one ethylenically unsaturated group, the polymerization mixture optionally further including one or both of a free radical initiator and a cross-linking agent having a plurality of ethylenically unsaturated groups; (b) inducing polymerization; and (c) upon completion of the polymerization reaction, exposing the polymer formed to L-lysine under neutral or basic conditions for amidating substantially all succinylic anhydride groups present in the polymer. In more specific embodiments, the method is used for the manufacture of lenses. To make contact lenses, the polymerization mixture of step (a) is transferred to a lens mold and polymerization is induced therein. Upon completion of the polymerization reaction, the lens formed is exposed to L-lysine. For a general method of manufacturing contact lenses and for preparing intraocular lenses, the polymerization mixture of step (a) is transferred to a mold for making a rod. Subsequent to polymerization, the rod is removed from the mold and cut into sections of an appropriate thickness. Lenses are prepared from the sections by a milling process well known in the art. Finally, the lenses are exposed to L-lysine.

In specific embodiments of the above method, maleic acid anhydride, 2-methyl maleic acid anhydride or 2,3-dimethyl-maleic acid anhydride is present in the polymerization mixture in an amount of between about 0.01 and 0.25% by weight.

In the method of the invention, the second or further monomer can be a hydrophilic monomer such as an hydroxyalkyl ester or amide, either N-substituted or unsubstituted, of an alpha-, beta-unsaturated carboxylic acid, a N-vinyl lactam or a 2-acrylamido-2-methylpropane sulfonic acid.

The second monomer or further monomer can also be a hydrophobic monomer such as an alkyl, cycloalkyl or aryl acrylate or methacrylate, a mono- or disubstituted itaconate, a styrene or styrene derivative, an acrylonitrile, a vinyl ester, a vinyl ether, an allyl ester, or a fluorine or silicon-containing acrylate or methacrylate.

The second and further monomer can also comprise combinations of monomers capable of forming a hydrogel, selected from the group consisting of hydroxyethylmethacrylate and methyl methacrylate, vinyl pyrrolidone and hydroxyethylmethacrylate, vinyl pyrrolidone and methyl methacrylate, glyceral methacrylate and methyl methacrylate, glyceryl-methacrylate and 2-hydroxyethylmethacrylate, hydroxyethylmethacrylate or diacetone acyl amide and hydroxyalkyl methacrylates, hydroxyethylmethacrylate or diacetone acyl amide and acrylates with the alkyl groups having from 2 to 6 carbon atoms, hydroxyethylmethacrylate or diacetone acyl amide and vinyl hydroxy acetate, hydroxyethylmethacrylate or diacetone acyl amide and vinyl hydroxy propionate, hydroxyethylmethacrylate or diacetone acyl amide and vinyl hydroxy butyrate, hydroxyethylmethacrylate or diacetone acyl amide and N-vinyl lactams namely N-vinyl pyrrolidone, N-vinyl caprolactam and N-vinyl piperidone, hydroxyethylmethacrylate or diacetone acyl amide and N,N dialkyl amino ethyl methacrylates and acrylates with the alkyl groups having from 0 to 2 carbon atoms, hydroxyethylmethacrylate or diacetone acyl amide and hydroxyalkyl vinyl ethers with the alkyl groups having 2 to 4 carbon atoms, hydroxyethylmethacrylate or diacetone acyl amide and 1-vinyloxy 2-hydroxyethylene, hydroxyethylmethacrylate or diacetone acyl amide and 1-vinyloxy 5-hydroxy 3-oxapentane, hydroxyethylmethacrylate or diacetone acyl amide and 1-vinyloxy 8-hydroxy 3,6-dioxaoctane, hydroxyethylmethacrylate or diacetone acyl amide and 1-vinyloxy 14-hydroxy 3,6,9,12 tetraoxatetradectane, hydroxyethylmethacrylate or diacetone acyl amide and N-vinyl morpholine; hydroxyethylmethacrylate or diacetone acyl amide and N,N dialkyl acrylamide with the alkyl groups having from 0 to 3 carbons atoms (N-isopropyl-acrylamide), hydroxyethylmethacrylate or diacetone acyl amide and alkyl vinyl ketone with the alkyl group having 1 to 2 carbon atoms, hydroxyethylmethacrylate or diacetone acyl amide and N-vinyl succinimide or N-vinyl glutarimide, hydroxyethylmethacrylate or diacetone acyl amide and N-vinyl imidazole, and hydroxyethylmethacrylate or diacetone acyl amide and N-vinyl 3-morpholinone.

In specific embodiments, the second monomer or further monomer can be a compound of the formula

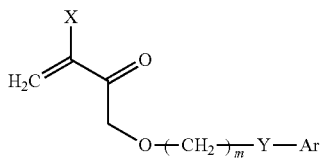

wherein: X is H or $CH_3$; m is 0-10; Y is nothing, O, S, or NR wherein R is H, $CH_3$, $C_nH_{2n+1}$ (n=1-10) iso-$OC_3H_7$, $C_6H_5$, or $CH_2C_6H_5$; Ar is any aromatic ring, such as benzene, which can be unsubstituted or substituted with H, $CH_3$, $C_2H_5$, n-$C_3H_7$, iso-$C_3H_7$, $OCH_3$, $C_6H_{11}$, Cl, Br, $C_6H_5$ or $CH_2C_6H_5$. In more specific embodiments, the second monomer or further monomer can be selected from the group consisting of 2-ethylphenoxy acrylate, 2-ethylphenoxy methacrylate, 2-ethylthiophenyl acrylate, 2-ethylthiophenyl methacrylate, 2-ethylaminophenyl acrylate, 2-ethylaminophenyl methacrylate, phenyl acrylate, phenyl methacrylate, benzyl acrylate, benzyl methacrylate, 2-phenylethyl acrylate, 2-phenylethyl methacrylate, 3-phenylpropyl acrylate, 3-phenylpropyl methacrylate, 3-propylphenoxy acrylate, 3-propylphenoxy methacrylate, 4-butylphenoxy acrylate, 4-butylphenoxy methacrylate, 4-phenylbutyl acrylate, 4-phenylbutyl methacrylate, 4-methylphenyl acrylate, 4-methylphenyl methacrylate, 4-methylbenzyl acrylate, 4-methylbenzyl methacrylate, 2-2-methylphenylethyl acrylate, 2-2-methylphenylethyl methacrylate, 2-3-methylphenylethyl acrylate, 2-3-methylphenylethyl methacrylate, 2-4-methylphenylethyl acrylate, 2-4-methylphenylethyl methacrylate, 2-(4-propylphenyl)ethyl acrylate, 2-(4-propylphenyl)ethyl methacrylate, 2-(4-(1-methylethyl)phenyl)ethyl acrylate, 2-(4-(1-methylethyl)phenyl)ethyl methacrylate, 2-(4-methoxyphenyl)ethyl acrylate, 2-(4-methoxyphenyl)ethyl methacrylate, 2-(4-cyclohexylphenyl)ethyl acrylate, 2-(4-cyclohexylphenyl)ethyl methacrylate, 2-(2-chlorophenyl)ethyl acrylate, 2-(2-chlorophenyl)ethyl methacrylate, 2-(3-chlorophenyl)ethyl acrylate, 2-(3-chlorophenyl)ethyl methacrylate, 2-(4-chlorophenyl)ethyl acrylate, 2-(4-chlorophenyl)ethyl methacrylate, 2-(4-bromophenyl)ethyl acrylate, 2-(4-bromophenyl)ethyl methacrylate, 2-(3-phenylphenyl)ethyl acrylate, 2-(3-phenylphenyl)ethyl methacrylate, 2-(4-phenylphenyl)ethyl methacrylate, 2-(4-phenylphenyl)ethyl methacrylate, 2-(4-benzylphenyl)ethyl acrylate, and 2-(4-benzylphenyl)ethyl methacrylate. In the latter specific embodiments of the method of the invention, the polymerization mixture can further include a hydrophilic monomer. The hydrophilic monomer can be hydroxyethylmetacrylate or another hydrophilic monomer such as a hydroxyalkyl ester or amide, either N-substituted or unsubstituted, of an alpha-, beta-unsaturated carboxylic acid, a N-vinyl lactam or a 2-acrylamido-2-methylpropane sulfonic acid.

In other specific embodiments of the method of the invention, the second monomer can be a silicon-containing monomer comprising an ethylenically unsaturated group, a siloxy macromer or a cyclosiloxane. To make silicon hydrogels, the polymerization mixture can include a further monomer that is a hydrophilic monomer. The hydrophilic monomer can be hydroxyethylmetacrylate or another hydrophilic monomer such as a hydroxyalkyl ester or amide, either N-substituted or unsubstituted, of an alpha-, beta-unsaturated carboxylic acid, a N-vinyl lactam or a 2-acrylamido-2-methylpropane sulfonic acid. In more specific embodiments, the silicon-containing monomer can be tris(trimethylsiloxy)methacryloxy propylsilane (TRIS), tris(trimethylsiloxy)propylvinyl carbamate, poly[dimethylsiloxyl]di[silylbutanol]bis[vinylcarbamate], methyldi(trimethylsiloxy) sylyipropylglycerol methacrylate, methyldi(trimethylsiloxy)sylylpropylglycerolethyl methacrylate, or heptamethyltrisiloxanyl ethyl acrylate.

In particular embodiments of the method of the invention, the polymerization mixture can include a photosensitizer, an ultraviolet light-absorbing compound and/or a blue light-absorbing compound.

The subject invention further relates to a biocompatible polymer comprising 2,3-linked succinyl-, 2-methylsuccinyl- or 2,3-dimethylsuccinyl-epsilon-L-lysinylamide prepared by the above-described method. In more specific embodiments, the succinyl-, 2-methylsuccinyl- or 2,3-dimethylsuccinyl-epsilon-L-lysylamide monomer is present in the polymer in an amount ranging from about 0.02% to 0.50%. The biocompatible polymer can further comprise an ultraviolet light-absorbing compound and/or a blue light-absorbing compound.

A further embodiment concerns a biocompatible polymer comprising at least two different monomers, of which one is succinyl-, 2-methylsuccinyl- or 2,3-dimethylsuccinyl-epsilon-L-lysinylamide. In more specific embodiments, the succinyl-, 2-methylsuccinyl- or 2,3-dimethylsuccinyl-epsilon-L-lysylamide monomer is present in the polymer in an amount ranging from about 0.02% to 0.50%. The biocompatible polymer can further comprise an ultraviolet light-absorbing compound and/or a blue light-absorbing compound.

Also encompassed by the invention are contact lenses made from a biocompatible polymer of the invention as well as intraocular lenses whose optical and/or haptic portions are made from a polymer of the invention.

DETAILED DESCRIPTION OF THE INVENTION

The biocompatible polymers of the invention can be used for making biocompatible intraocular lenses or contact lenses. The biocompatible polymers are produced in a sequential process. First, polymers are formed by co-polymerization of one or more polymerizable monomers, which monomers are characterized as having at least one ethylenically unsaturated group, and maleic acid anhydride. Instead of maleic acid anhydride, 2-methylmaleic acid anhydride or 2,3-dimethylmaleic acid anhydride can be used. Polymerization mixtures typically include vinylic or acrylic monomers, maleic acid anhydride and, optionally, a free radical initiator and a cross-linking agent having a plurality of polymerizable, ethylenically unsaturated groups. The maleic acid anhydride (or the 2-methylmaleic acid anhydride, or the 2,3-dimethylmaleic acid anhydride) is typically present in the polymerization mixture in an amount ranging from about 0.01 to 0.25% by weight. The polymerization mixtures can also include a photosensitizer, an ultraviolet-absorbing compound and a blue light-absorbing compound. It is noted that instead of making use a free radical initiator, polymerization can be induced by irradiation. Maleic acid anhydride, 2-methylmaleic acid anhydride and 2,3-dimethylmaleic acid anhydride are available from Fluke Chemie AG, Buchs, Switzerland.

It is noted that useful monomers not only comprise compounds containing an ethylenically unsaturated group but also encompass compounds having a ring structure capable of being induced to open. Such compounds are described, e.g., in U.S. Pat. No. 6,066,172. The use of such monomers shall also be considered as being within the scope of the invention.

When day-use or extended use (overnight) contact lenses are produced, polymerization may be induced directly in suitable molds. For the production of intraocular lenses or contact lenses in general, polymer rods can be produced that are subsequently cut down to obtain pellets, from which pellets lenses are milled by techniques well known in the art.

Monomers that can be used for making polymers of the subject invention may have a hydrophobic or a hydrophilic character. Depending on the character of the monomer used, or the relative amounts of monomers of different character employed, a product polymer is either hydrophobic or displays a more hydrophilic character. Hydrogel co-polymers of the invention may be prepared by co-polymerization of methylated or unmethylated maleic acid anhydride and one or more monomeric components, at least one of which will have a hydrophilic nature and be capable of forming a hydrogel in a cross-linked polymer. "Hydrogels" are understood to be cross-linked polymers that, upon hydration, have an equilibrium content of between about 5% and 95% of water. Hydrogel polymers of the invention can be used for the manufacture of biocompatible, soft optical lenses, including contact lenses and foldable intraocular lenses. Many intorocular lenses have distinguishable optic and haptic portions. The optic portion of a foldable intraocular lens or a soft contact lens will preferably have a water content of at least about 25%.

Suitable hydrophobic monomers useful for preparing polymers of the invention include but are not limited to cycloalkyl ester, tertiary-butyl styrene, polycyclic acrylate or methacrylate, and the like as well as mixtures thereof. More particularly, the polycyclic acrylics may be isobornyl acrylate, isobornyl methacrylate, dicyclopentanedienyl acrylate, dicyclopentanedienyl methacrylate, adamantyl acrylate, adamantyl methacrylate, isopinocamphyl acrylate, isopinocamphyl methacrylate, etc., and mixtures thereof. Cycloalkyl ester monomer is of formula I below (Formula I from U.S. Pat. No. 4,668,506). Illustrative of these cycloalkyl esters are menthyl methacrylate, menthyl acrylate, tertiary-butyl cyclohexyl methacrylate, isohexyl cyclopentyl acrylate, methylisopentyl cyclooctyl acrylate and the like.

Formula I

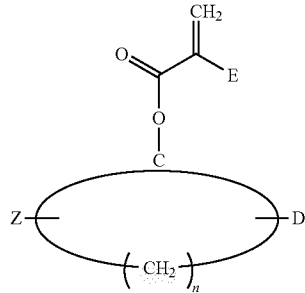

wherein: D is branched or normal alkyl of 3 to 6 carbon atoms, E is H or $CH_3$, Z is H or $CH_3$, and n is an integer from 3 to 8.

Other well known hydrophobic monomers include alkyl, cyclo-alkyl and aryl acrylates and methacrylates as well as mono- or disubstituted itaconates, styrene and its derivatives, acrylonitrile, vinyl esters such as vinyl acetate or vinyl pentacetyl gluconate, vinyl ethers such as vinyl butyl ether, allyl esters such as allyl acetate, propionate or butyrate, fluorine containing monomers such as octafluoropentyl methacrylate and silicon-containing monomers such as tris(trimethylsiloxy)methacryloxy propylsilane (TRIS), tris(trimethylsiloxy)propylvinyl carbamate, poly[dimethylsiloxyl]di[silylbutanol]bis[vinyl carbamate], methyldi(trimethylsiloxy) sylylpropylglycerol methacrylate (described in U.S. Pat. No. 4,139,513 to Tanaka), methyldi(trimethylsiloxy)sylylpropylglycerolethyl methacrylate (ibidem), or heptamethyltrisiloxanyl ethyl acrylate. Formula II below represents a specific group of aryl and methacryl arylates and related compounds.

Formula II

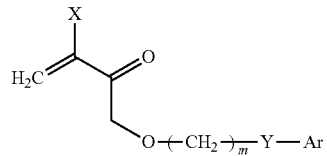

wherein: X is H or $CH_3$; m is 0-10; Y is nothing, O, S, or NR wherein R is H, $CH_3$, $C_nH_{2n+1}$ (n=1-10) iso-$OC_3H_7$, $C_6H_5$, or $CH_2C_6H_5$; Ar is any aromatic ring, such as benzene, which can be unsubstituted or substituted with H, $CH_3$, $C_2H_5$, n-$C_3H_7$, iso-$C_3H_7$, $OCH_3$, $C_6H_{11}$, Cl, Br, $C_6H_5$ or $CH_2C_6H_5$.

Suitable monomers of formula II include, but are not limited to: 2-ethylphenoxy methacrylate, 2-ethylphenoxy acrylate, 2-ethylthiophenyl methacrylate, 2-ethylthiophenyl acrylate, 2-ethylaminophenyl methacrylate, phenyl methacrylate, benzyl methacrylate, 2-phenylethyl methacrylate, 3-phenylpropyl methacrylate, 3-propylphenoxy methacrylate, 4-butylphenoxy metacrylate, 4-phenylbutyl methacrylate, 4-methylphenyl methacrylate, 4-methylbenzyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethylmethacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-phenylphenyl)ethyl methacrylate), 2-(4-benzylphenyl)ethyl methacrylate, and the like, including the corresponding methacrylates and acrylates.

Hydrophilic reactive monomers include, for example, the hydroxyalkyl esters and amides, both N-substituted and unsubstituted, of alpha-, beta-unsaturated carboxylic acids, N-vinyl lactams and 2-acrylamido-2-methylpropane sulfonic acid. The alpha-, beta-unsaturated acids useful in this invention are acrylic acid, crotonic acid, methacrylic acid, itaconic acid, maleic acid, maleic anhydride, fumaric acid and the like. The polyfunctional alcohols which form the hydroxyalkyl esters include glycol, glycerol, propylene glycol, trimethylene glycol and other polyhydric alkanols, dialkylene glycols of 2 to 12 carbon atoms, polyalkylene glycols, etc. Polyalkylene glycols are exemplified by triethylene glycol, tetraethylene glycol, pentaethylene glycol, hexaethylene glycol and the like. The preferred hydrophilic monomers are the hydroxyalkyl esters, specifically hydroxyethyl methacrylate.

Suitable combinations of monomeric components that can be co-polymerized in the presence of maleic acid anhydride or methylated maleic acid anhydride to produce hydrogel polymers comprise hydroxyethylmethacrylate and methyl methacrylate, vinyl pyrrolidone and hydroxyethylmethacrylate, vinyl pyrrolidone and methyl methacrylate, glyceral methacrylate and methyl methacrylate, glyceryl-methacrylate and 2-hydroxyethylmethacrylate, hydroxyethylmethacrylate or diacetone acyl amide and hydroxyalkyl methacrylates, hydroxyethylmethacrylate or diacetone acyl amide and acrylates with the alkyl groups having from 2 to 6 carbon atoms, hydroxyethylmethacrylate or diacetone acyl amide and vinyl hydroxy acetate, hydroxyethylmethacrylate or diacetone acyl amide and vinyl hydroxy propionate, hydroxyethylmethacrylate or diacetone acyl amide and vinyl hydroxy butyrate, hydroxyethylmethacrylate or diacetone acyl amide and N-vinyl lactams namely N-vinyl pyrrolidone, N-vinyl caprolactam and N-vinyl piperidone, hydroxyethylmethacrylate or diacetone acyl amide and N,N dialkyl amino ethyl methacrylates and acrylates with the alkyl groups having from 0 to 2 carbon atoms, hydroxyethylmethacrylate or diacetone acyl amide and hydroxyalkyl vinyl ethers with the alkyl groups having 2 to 4 carbon atoms, hydroxyethylmethacrylate or diacetone acyl amide and 1-vinyloxy 2-hydroxyethylene, hydroxyethylmethacrylate or diacetone acyl amide and 1-vinyloxy 5-hydroxy 3-oxapentane, hydroxyethylmethacrylate or diacetone acyl amide and 1-vinyloxy 8-hydroxy 3,6-dioxaoctane, hydroxyethylmethacrylate or diacetone acyl amide and 1-vinyloxy 14-hydroxy 3,6,9,12 tetraoxatetradectane, hydroxyethylmethacrylate or diacetone acyl amide and N-vinyl morpholine; hydroxyethylmethacrylate or diacetone acyl amide and N,N dialkyl acrylamide with the alkyl groups having from 0 to 3 carbons atoms (N-isopropyl-acrylamide), hydroxyethylmethacrylate or diacetone acyl amide and alkyl vinyl ketone with the alkyl group having 1 to 2 carbon atoms, hydroxyethylmethacrylate or diacetone acyl amide and N-vinyl succinimide or N-vinyl glutarimide, hydroxyethylmethacrylate or diacetone acyl amide and N-vinyl imidazole, and hydroxyethylmethacrylate or diacetone acyl amide and N-vinyl 3-morpholinone.

How silicon hydrogels are prepared is well known in the art. To make a silicon hydrogel of the invention, methylated or unmethylated maleic acid anhydride is co-polymerized with a silicon-containing monomer or macromer and at least one hydrophilic monomer. Example silicon-containing monomers are methyldi(trimethylsiloxy)sylylpropylglycerol methacrylate and methyldi(trimethylsiloxy)sylylpropylglycerolethyl methacrylate. These monomers can be co-polymerized with hydrophilic monomers such as ethylene glycol monomethacrylate, diethylene glycol monomethacrylate, triethylene glycol monomethacrylate, N-vinyl pyrrolidone or dimethyl acrylamide (U.S. Pat. No. 4,139,513). Bausch & Lomb's PureVision lens was prepared by co-polymerization of tris(trimethylsiloxy)propylvinyl carbamate, poly[dimethylsiloxyl]di[silylbutanol]bis[vinyl carbamate], N-vinyl pyrrolidone and N-carboxyvinyl ester. CIBA Vision's "Focus Night & Day" lens is a co-polymer of tris(trimethylsiloxy) methacryloxy propylsilane (TRIS), a fluoroether siloxane macromer and N,N-dimethyl acrylamide. Other silicon hydrogel lenses were prepared by co-polymerizing 3,3,3-trifluoropropylmethyl cyclotrisiloxane, 1,3,5-trimethyl-1,3,5-triphenyl cyclotrisiloxane and 1,3-divinyltetramethyldisiloxane (U.S. Pat. No. 6,066,172) or by co-polymerization of TRIS, N,N-dimethylacrylamide, methyl methacrylate and hydroxyethyl methacrylate (U.S. patent publication No. 20090190090). Corresponding silicon-containing hydrogels of the invention can be produced by co-polymerization of the latter mixtures of monomers and methylated or unmethylated maleic acid anhydride added in an amount of between about 0.01 and 0.25% by weight.

Polymerization mixtures for the production of polymers of the invention can also include a co-polymerizable cross-linker. A suitable cross-linking agent may be any terminally ethylenically unsaturated compound having more than one unsaturated group, i.e., a multiplicity of unsaturated groups. More particularly, suitable cross-linking agents include, but are not limited to, the following: ethylene glycol diacrylate or dimethacrylate, diethylene glycol diacrylate or dimethacrylate, triethylene glycol diacrylate or dimethacrylate, tetraethylene glycol diacrylate or dimethacrylate, polyethylene glycol diacrylate or dimethacrylate, trimethylolpropane triacrylate or trimethacrylate, bisphenol A diacrylate or dimethacrylate, ethoxylated bisphenol A diacrylate or dimethacrylate, pentaerythritol tri- and tetra-acrylate or methacrylate, tetramethylene diacrylate or dimethacrylate, methylene bisacrylamide or methacrylamide, dimethylene bisacrylamide or methacrylamide, N,N'-dihydroxyethylene bisacrylamide or methacrylamide, hexamethylene bisacrylamide or methacrylamide, decamethylene bisacrylamide or methacrylamide, divinyl benzene, vinyl methacrylate, allyl methacrylate, etc. Additional useful cross-linking agents include 1,3-bis(4-methacryloyl oxyalkyl)tetra disiloxane and similar poly(organo-siloxane)monomers set forth in U.S. Pat. No. 4,153,641. Another group of useful cross-linking agents are the resonance-free di(alkylene tertiary amine) cyclic compounds, e.g., N,N'-divinyl ethylene urea, as disclosed in U.S. Pat. No. 4,436,887. Yet another group are di- or polyvinyl ethers of di- or polyvalent alcohols such as ethylene glycol divinyl ether. Cross-linking agents can be used in varying amounts from about 0.1 to about 20% by weight, but are preferably present in an amount of about 0.5% by weight of total monomers present.

Polymerization mixtures for the production of polymers of the invention typically include a free-radical initiator. Initiators can be thermal initiators or photoinitiaters. Typical thermal free radical initiators include peroxides, such as benzophenone peroxide, peroxycarbonates such as bis-(4-t-butylcyclohexyl)peroxydicarbonate, azonitriles such as azobisisobutyronitrile, and the like. A preferred initiator is bis-(4-t-butylcyclohexyl)peroxydicarbonate. Alternatively, the monomers can be photo-polymerized in a container or mold that is transparent to radiation of a wavelength capable of initiating polymerization of the acrylic monomers. Conventional photoinitiator compounds, e.g., a benzophenone-type photoinitiator, can also be introduced to facilitate the polymerization. Photosensitizers can be introduced as well to permit the use of longer wavelengths; however, when preparing a polymer which is intended for long residence within or in contact with the human body or a human tissue, it is generally preferable to keep the number of ingredients in the polymer to a minimum to avoid the presence of materials which might leach out from the polymer into the tissue.

An ultraviolet light-absorbing material can also be included in the polymers of the invention. This is of particular importance in the case of intraocular lenses made from polymers of the invention, in which case inclusion of ultraviolet-absorbing material is intended to produce an absorbance approximately that of the natural lens of the eye. The ultraviolet-absorbing material can be any compound that absorbs ultraviolet light, i.e., light having a wavelength shorter than about 400 nm, but does not absorb any substantial amount of visible light. The ultraviolet-absorbing compound is incorporated into the polymerization mixture and is entrapped in the polymer matrix upon polymerization. Suitable ultraviolet-absorbing compounds include substituted benzophenones, such as 2-hydroxybenzophenone, and 2-(2-hydroxyphenyl) benzotriazoles. It is preferred to use an ultraviolet-absorbing compound that is co-polymerizable with the monomers and is thereby covalently bound to the polymer matrix. In this way possible leaching of the ultraviolet-absorbing compound out of an article made from polymers of the invention, e.g. from a lens into the interior of the eye, is minimized. Suitable co-polymerizable ultraviolet-absorbing compounds are the substituted 2-hydroxybenzophenones disclosed in U.S. Pat. No. 4,304,895 and the 2-hydroxy-5-acryloxyphenyl-2H-benzotriazoles disclosed in U.S. Pat. No. 4,528,311. The most preferred ultraviolet absorbing compound is 2-(3'-methallyl-2'-hydroxy-5'-methyl phenyl)benzotriazole. UV absorbers are typically present in an amount of 0.1-5% by weight of total monomers present in the polymerization mixture.

It is also known that high-energy blue light can damage the retina. In fact, the human intraocular lens produces yellow pigment that mitigates against such damage. Therefore, a blue light-absorbing compound may be included in the polymers of the invention when they are used to prepare replacement intraocular lenses. Suitable co-polymerizable blue light-blocking chromophores are described, e.g., in U.S. Pat. Nos. 4,528,311 and 5,470,932. Blue light absorbers are typically present in an amount of 0.01-0.5% by weight of total monomers present.

In a final step of producing a biocompatible polymer of the invention, the polymer prepared as described above is incubated for an extensive period in a solution containing L-lysine at an elevated concentration. For hydrophilic polymers, i.e., polymers that form hydrogels upon soaking, the solution may be completely aqueous-based. For more hydrophobic, less wettable polymers, a solution of L-lysine in 70% water-30% dimethylformamide should be utilized. For example, polymer may be exposed for a period of about 72 hours to 10% L-lysine (free base) at room temperature. It is noted that the pH of the incubation mixture should be neutral or basic. Ideally, the pH should be between about 7 and 9. During this incubation, polymer is hydrated, and L-lysine reacts with the co-polymerized succinylic anhydride, whereby a succinylic epsilon-lysylamide is formed. An extensive incubation period ensures that essentially all anhydride functions are amidated, avoiding potential problems that may arise in the eye when a lens made from polymer of the invention still containing anhydride groups is exposed to certain compounds present in the tear fluid. Excess free L-lysine is removed eventually from the polymer by incubation in an aqueous solution. The incorporation of epsilon-linked L-lysine with a free alpha-amino carboxy function within and on the surface of the polymer of step one provides the polymer with a biological coating that greatly enhances the biocompatibility of the product.

The above-described preferred method of preparation of biocompatible polymers comprising epsilon-linked L-lysine relied on co-polymerization of methylated or unmethylated maleic acid anhydride and a second or further monomer containing an ethylenically unsaturated group or a ring structure capable of being opened. An analogous method comprises co-polymerization of a substituted or unsubstituted vinylic or acrylic phthalic acid anhydride, e.g., acryloyl-2-amido-phthalic acid anhydride and maleinyl-di-2-amido-phthalic acid anhydride, and a second or further monomer. The subject invention is considered as also encompassing this alternative method, the resulting polymers and articles manufactured therefrom. The detailed description of the preferred method and its products provided herein shall apply mutatis mutandis to the latter alternative method and its products. Acryloyl-2-amido-phthalic acid anhydride can be prepared by amidification of acrylchloride (Fluka) with 2-amino-phthalic acid anhydride (CAS 17011-53-9; Aldrich) in diethylether (refluxing for one hour at 60° C.), evaporation of solvent and re-crystallization from ethanol. Maleinyl-di-2-amido-phthalic acid anhydride can be prepared analogously, using maleinyl dichloride (Merck) and 2-amino-phthalic acid anhydride (Aldrich) as the starting materials.

All references cited herein shall be considered as having been incorporated in their entirety. The invention is further elaborated by the following examples. The examples are provided for purposes of illustration to a person skilled in the art and are not intended to be limiting the scope of the invention as described in the claims. Thus, the invention should not be construed as being limited to the examples provided, but should be construed to encompass any and all variations that become evident as a result of the teaching provided herein.

EXAMPLES

Example 1

Preparation of Polymer A

Maleic anhydride (0.75 g; obtained from Fluka Chemie AG, Buchs, Switzerland) and N,N'-methylene-bis(acrylamide) (0.75 g; obtained from Fluka) were dissolved under stirring in 2-hydroxyethyl methacrylate (60 g; obtained from Alfa Chemicals Ltd., Binfield. UK). Azobisisobutyronitrile (2,2'-azobis(2-methylpropionitrile)) (15 mg; obtained from Fluka) was then added to the solution. Aliquots of 10 ml of the mixture were added into polypropylene tubes. The tubes were incubated at 95° C. in an oil bath for 10 minutes. Polymerized rods were removed from the tubes and cut into 3 millimeter-thick pellets. These pellets can be further processed (by milling) into lenses, typically permanent contact lenses or intraocular lenses. The polymerization mixture can also be directly distributed to molds for the production of day-use or extended-use contact lenses. To complete formation of a polymer of the invention, the pellets were incubated for 24 hours in a 10% aqueous solution of L-lysine at room temperature and were subsequently re-equilibrated in phosphate buffered saline (50 mM sodium phosphate, 0.8% NaCl, pH 7.2) (PBS) for 48 hours.

Example 2

Preparation of Polymer B

Maleic anhydride (15 g; obtained from Fluka), N,N'-methylene-bis(acrylamide) (1.5 g; obtained from Fluka) and N,N,N',N'-tetramethylethylenediamine (75 mg; from Fluka) were dissolved under stirring in 2-hydroxyethyl methacrylate (60 g; obtained from Alfa). Azobisisobutyronitrile (2,2'-azobis(2-methylpropionitrile)) (30 mg; obtained from Fluka) was then added to the solution. Aliquots of 10 ml of the mixture were added into polypropylene tubes. The tubes were incubated at 95° C. in an oil bath for 10 minutes. Polymerized rods were removed from the tubes and cut into 3 millimeter-thick pellets. To complete formation of a polymer of the invention, the pellets were incubated for 24 hours in a 10% aqueous solution of L-lysine at room temperature and were subsequently re-equilibrated in PBS for 48 hours.

Example 3

Preparation of Polymer C

Maleic anhydride (120 g; obtained from Fluke), N,N'-methylene-bis(acrylamide) (3 g; obtained from Fluke) and N,N,N',N'-tetramethylethylenediamine (75 mg; from Fluka) were dissolved under stirring in methylmethacrylate (60 g; obtained from Fluke). Azobisisobutyronitrile (2,2'-azobis(2-methylpropionitrile)) (15 mg; obtained from Fluka) was then added to the solution. Aliquots of 10 ml of the mixture were added into polypropylene tubes. The tubes were incubated at 95° C. in an oil bath for 10 minutes. Polymerized rods were removed from the tubes and cut into 3 millimeter-thick pellets. To prepare a polymer of the invention, the pellets were incubated for 24 hours in a 10% solution of L-lysine in 70% water/30% dimethylformamide at room temperature. The pellets were subsequently re-equilibrated in PBS for 48 hours.

Example 4

Preparation of Polymer D

The following chemicals were mixed to form a clear solution (110 g total): methacryloxy propyl tris(trimethylsiloxy) silane (47 parts), N,N-dimethylacrylamide (42 parts), maleic acid anhydride (10 parts), methylmethacrylate (8 parts), hydroxyethylmethacrylate (2 parts), ethylene glycol dimethacrylate (1.5 parts), 2,2'-azobis(2,4-dimethylvaleronitrile) (1 part). Aliquots of 10 ml of the mixture were added into polypropylene tubes. The tubes were incubated at 95° C. in an oil bath for 10 minutes. Polymerized rods were removed from the tubes and cut into 3 millimeter-thick pellets. To prepare a polymer of the invention, the pellets were incubated for 24 hours in a 10% aqueous solution of L-lysine at room temperature. The pellets were subsequently re-equilibrated in PBS for 48 hours.

Example 5

Comparative Biological Analysis of Polymers of the Invention Containing Epsilon-Linked L-Lysine and Corresponding Non-Lysine-Containing (Conventional) Polymers The polymers of the invention have a surprisingly high biocompatibility (or biophilicity). This was evident from a comparative analysis of proliferation of primary fibroblasts from human embryonic tissue on slabs of the different polymers listed in Table 1 below. Data from a representative experiment are reported.

TABLE 1

Biocompatibility of different polymers

| Characterization of polymers | Percent Confluence |
| --- | --- |
| Collagen | 100 |
| Polymer A prepared w/o maleic acid anhydride | 12 |
| Polymer A | 62 |
| Polymer B prepared w/o maleic acid anhydride | 10 |
| Polymer B | 94 |
| Polymer C prepared w/o maleic acid anhydride | 7 |
| Polymer C | 56 |
| Polymer D prepared w/o maleic acid anhydride | 3 |
| Polymer D | 44 |

Circular polymer slabs for insertion in polycarbonate petri dishes (2 cm in diameter) were prepared as follows. Pairs of 5-cm rectangular glass plates separated by 2-millimeter spacers were filled with polymerization mixtures for polymers A-D described under the previous examples, and, to provide appropriate controls, with corresponding mixtures lacking maleic acid anhydride. For polymerization, the filled and sealed glass chambers were heated at 40° C. for 5 hours and post-cured at 80° C. for 6 hours. The polymerized slabs were removed from the glass plates, and each was incubated under sterile conditions in 100 ml of 10% L-lysine in water or water/dimethylformamide (see under examples 1-4) for 24 hours at room temperature. The slabs were subsequently rinsed 3 times with 100 ml of sterile water. Finally, the slabs were incubated for 48 hours with 100 ml PBS. Circular slabs (1.9 cm in diameter) were cut from the rectangular slabs, maintaining sterile conditions, and were placed into 2-cm petri dishes. To the sterile dishes were added 2 ml of Dulbecco's modified Eagle medium buffered with 2.2 g/l sodium bicarbonate and supplemented with 5% fetal calf serum, 10% heat-inactivated horse serum, 100 µml penicillin and 100 µg/ml streptomycin. After being seeded with primary fibroblasts from human embryonic tissue (obtained from the hospital of the University of Basel, Switzerland) to about 5% confluence, the dishes were incubated at 37° C. and under 5% $CO_2$. Medium was changed every 24 hours. The experiment was continued until the collagen-containing dish appeared to be confluent. Degrees of confluence (expressed in %) were finally determined from an analysis of photographs of different cultures taken at the end of the experimental period.

The invention claimed is:
1. A method of preparing a biocompatible polymer comprising epsilon-linked L-lysine having free alpha-amino and carboxy functions comprising the steps of
   (a) preparing a polymerization mixture comprising at least two monomers, of which the first monomer is 2-methylated, 2,3-dimethylated or unmethylated maleic acid anhydride, or substituted or unsubstituted vinylic or acrylic phthalic acid anhydride and the second or further monomer is a different monomer having at least one ethylenically unsaturated group, the polymerization mixture optionally further including one or both of a free radical initiator and a cross-linking agent having a plurality of ethylenically unsaturated groups;
   (b) inducing polymerization; and
   (c) upon completion of the polymerization reaction, exposing the polymer formed to L-lysine under basic condi- tions for amidating substantially all succinylic anhydride groups present in the polymer, wherein the second and further monomer comprise combinations of monomers capable of forming a hydrogel, selected from the group consisting of hydroxyethylmethacrylate and methyl methacrylate, vinyl pyrrolidone and hydroxyethylmethacrylate, vinyl pyrrolidone and methyl methacrylate, glycerol methacrylate and methyl methacrylate, glyceryl-methacrylate and 2-hydroxyethyimethacrylate, hydroxyethylmethacrylate or diacetone acyl amide and hydroxyalkyl methacrylates, hydroxyethylmethacrylate or diacetone acyl amide and acrylates with the alkyl groups having from 2 to 6 carbon atoms, hydroxyethylmethacrylate or diacetone acyl amide and vinyl hydroxy acetate, hydroxyethylmethacrylate or diacetone acyl amide and vinyl hydroxy propionate, hydroxyethylmethacrylate or diacetone acyl amide and vinyl hydroxy butyrate, hydroxyethylmethacrylate or diacetone acyl amide and a N-vinyl lactams, hydroxyethylmethacrylate or diacetone acyl amide and N,N dialkyl amino ethyl methacrylates and acrylates with the alkyl groups having from 0 to 2 carbon atoms, hydroxyethylmethacrylate or diacetone acyl amide and hydroxyalkyl vinyl ethers with the alkyl groups having 2 to 4 carbon atoms, hydroxyethylmethacrylate or diacetone acyl amide and 1-vinyloxy 2-hydroxyethylene, hydroxyethylmethacrylate or diacetone acyl amide and 1-vinyloxy 5-hydroxy 3-oxapentane, hydroxyethylmethacrylate or diacetone acyl amide and 1-vinyloxy 8-hydroxy 3,6-dioxaoctane, hydroxyethylmethacrylate or diacetone acyl amide and 1-vinyloxy 14-hydroxy 3,6,9,12 tetraoxatetradectane, hydroxyethylmethacrylate or diacetone acyl amide and N-vinyl morpholine; hydroxyethylmethacrylate or diacetone acyl amide and N,N dialkyl acrylamide with the alkyl groups having from 0 to 3 carbons atoms, hydroxyethylmethacrylate or diacetone acyl amide and alkyl vinyl ketone with the alkyl group having 1 to 2 carbon atoms, hydroxyethylmethacrylate or diacetone acyl amide and N-vinyl succinimide or N-vinyl glutarim ide, hydroxyethylmethacrylate or diacetone acyl amide and N-vinyl imidazole, and hydroxyethylmethacrylate or diacetone acyl amide and N-vinyl 3-morpholinone.

2. A method of preparing a biocompatible polymer comprising epsilon-linked L-lysine having free alpha-amino and carboxy functions comprising the steps of
(a) preparing a polymerization mixture comprising at least two monomers, of which the first monomer is 2-methylated, 2,3-dimethylated or unmethylated maleic acid anhydride, or substituted or unsubstituted vinylic or acrylic phthalic acid anhydride and the second or further monomer is a different monomer having at least one ethylenically unsaturated group, the polymerization mixture optionally further including one or both of a free radical initiator and a cross-linking agent having a plurality of ethylenically unsaturated groups;
(b) inducing polymerization; and
(c) upon completion of the polymerization reaction, exposing the polymer formed to L-lysine under basic conditions for amidating substantially all succinylic anhydride groups present in the polymer,
    wherein the second monomer or further monomer is a compound of the formula

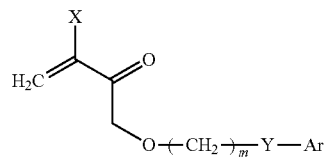

wherein:
X is H or $CH_3$; m is 0-10; Y is nothing, O, S, or NR wherein R is H, $CH_3$, $C_nH_{2n+1}$(n=1-10) iso-$OC_3H_7$, $C_6H_5$, or $CH_2C_6H_5$; Ar is any aromatic ring, such as benzene, which can be unsubstituted or substituted with H, $CH_3$, $C_2H_5$, n-$C_3H_7$, iso-$C_3H_7$, $OCH_3$, $C_6H_{11}$, Cl, Br, $C_6H_5$ or $CH_2C_6H_5$.

3. The method of claim 2, wherein the second monomer or further monomer is selected from the group consisting of 2-ethylphenoxy acrylate, 2-ethylphenoxy methacrylate, 2-ethylthiophenyl acrylate, 2-ethylthiophenyl methacrylate, 2-ethylaminophenyl acrylate, 2-ethylaminophenyl methacrylate, phenyl acrylate, phenyl methacrylate, benzyl acrylate, benzyl methacrylate, 2-phenylethyl acrylate, 2-phenylethyl methacrylate, 3-phenylpropyl acrylate, 3-phenylpropyl methacrylate, 3-propylphenoxy acrylate, 3-propylphenoxy methacrylate, 4-butylphenoxy acrylate, 4-butylphenoxy methacrylate, 4-phenylbutyl acrylate, 4-phenylbutyl methacrylate, 4-methylphenyl acrylate, 4-methylphenyl methacrylate, 4-methylbenzyl acrylate, 4-methylbenzyl methacrylate, 2-2-methylphenylethyl acrylate, 2-2-methylphenylethyl methacrylate, 2-3-methylphenylethyl acrylate, 2-3-methylphenyl ethyl methacrylate, 2-4-methyl phenylethyl acrylate, 2-4-methylphenylethyl methacrylate, 2-(4-propylphenyl)ethyl acrylate, 2-(4-propylphenyl)ethyl methacrylate, 2-(4(1-methylethyl)phenyl)ethyl acrylate, 2-4-(1-methylethyl) phenyl)ethyl methacrylate, 2-(4-methoxyphenyl)ethyl acrylate, 2-(4-methoxyphenyl) ethyl methacrylate, 2-(4-cyclohexylphenyl)ethyl acrylate, 2-(4-cyclohexylphenyl)ethyl methacrylate, 2-(2-chlorophenyl) ethyl acrylate, 2-(2-chlorophenyl) ethyl methacrylate, 2-(3-chlorophenyl)ethyl acrylate, 2 -(3-chlorophenyl) ethyl methacrylate, 2 -(4-chlorophenyl)ethyl acrylate, 2-(4-chlorophenyl) ethyl methacrylate, 2-(4-bromophenyl)ethyl acrylate, 2-(4-bromophenyl) ethyl methacrylate, 2-(3-phenylphenyl)ethyl acrylate, 2-(3-phenylphenyl) ethyl methacrylate, 2-(4-phenylphenyl)ethyl methacrylate, 2-(4-phenylphenyl) ethyl methacrylate, 2(4-benzylphenyl)ethyl acrylate, and 2-(4-benzylphenyl) ethyl methacrylate.

4. The method of claim 2, wherein a further monomer is a hydrophilic monomer.

5. The method of claim 4, wherein a wherein the further monomer is a hydrophilic monomer that is a hydroxyalkyl ester or amide, either N-substituted or unsubstituted, of an alpha-, beta-unsaturated carboxylic acid, a N-vinyl lactam or a 2-acrylamido-2-methylpropane sulfonic acid.

6. A method of preparing a biocompatible polymer comprising epsilon-linked L-lysine having free alpha-amino and carboxy functions comprising the steps of
(a) preparing a polymerization mixture comprising at least two monomers, of which the first monomer is 2-methylated, 2,3-dimethylated or unmethylated maleic acid anhydride, or substituted or unsubstituted vinylic or acrylic phthalic acid anhydride and the second or further monomer is a different monomer having at least one ethylenically unsaturated group, the polymerization mixture optionally further including one or both of a free radical initiator and a cross-linking agent having a plurality of ethylenically unsaturated groups;
(b) inducing polymerization; and
(c) upon completion of the polymerization reaction, exposing the polymer formed to L-lysine under basic conditions for amidating substantially all succinylic anhydride groups present in the polymer,
wherein the second or further monomer is a silicon-containing monomer comprising an ethylenically unsaturated group, a siloxy macromer or a cyclosiloxane.

7. The method of claim 6, wherein a further monomer is a hydrophilic monomer.

8. The method of claim 7, wherein the further monomer is a hydroxyalkyl ester or amide, either N-substituted or unsubstituted, of an alpha-, beta-unsaturated carboxylic acid, a N-vinyl lactam or a 2-acrylamido-2-methylpropane sulfonic acid.

9. The method of claim 6, wherein the silicon-containing monomer is tris(trimethylsiloxy) methacryloxy propylsilane (TRIS), tris(trimethylsiloxy) propylvinyl carbamate, poly[dimethylsiloxyl] di [silylbutanol] bis[vinyl carbamate], methyldi(trimethylsiloxy)sylylpropylglycerol methacrylate, methyldi(trimethylsiloxy)sylylpropylglycerolethyl methacrylate, or heptamethyltrisiloxanyl ethyl acrylate.

10. The method of claim 6, wherein the polymerization mixture further includes one or more components selected from the group consisting of a photosensitizer, an ultraviolet light-absorbing compound and a blue light-absorbing compound.

11. A method of preparing a biocompatible contact lens comprising the steps of
(a) preparing a polymerization mixture comprising at least two monomers, of which the first monomer is 2-methylated, 2,3-dimethylated or unmethylated maleic acid anhydride, or substituted or unsubstituted vinylic or acrylic phthalic acid anhydride and the second or further monomer is a different monomer having at least and ethylenically unsaturated group, the polymerization mixture optionally further including one or both of a free radical initiator and a cross-linking agent having a plurality of ethylenically unsaturated groups;
(b) transferring polymerization mixture to a lens mold and inducing polymerization therein; and
(c) upon completion of the polymerization reaction and subsequent removal of the lens from the mold, exposing the lens formed to L-lysine under basic conditions for amidating succinylic anhydride groups present in the lens.

12. A method of preparing a biocompatible contact or intraocular lens comprising the steps of
(a) preparing a polymerization mixture comprising at least two monomers, of which the first monomer is 2-methylated, 2,3-dimethylated or unmethylated maleic acid anhydride, or substituted or unsubstituted vinylic or acrylic phthalic acid anhydride and the second or further monomer is a different monomer having at least one ethylenically unsaturated group, the polymerization mixture optionally further including one or both of a free radical initiator and a cross-linking agent having a plurality of ethylenically unsaturated groups;
(b) transferring polymerization mixture to a mold for producing a rod and inducing polymerization therein;
(c) upon completion of the polymerization reaction, removing the rod from the mold, cutting the mold into sections of an appropriate thickness and milling a section into a lens; and
(d) exposing the lens to L-lysine under basic conditions for amidating succinylic anhydride groups present in the lens.

13. The method of claim 11-12, wherein the maleic acid anhydride, the 2-methylmaleic acid anhydride or the 2,3-dimethylmaleic acid anhydride is present in the polymerization mixture in an amount of between about 0.01 to 0.25% by weight.

14. A biocompatible polymer comprising 2,3-linked succinyl-, 2-methylsuccinyl- or 2,3-dimethylsuccinyl-epsilon-L-lysinylamide prepared by the method of claim 6.

15. The polymer of claim 14, wherein the succinyl-, 2-methylsuccinyl- or 2,3-dimethylsuccinyl-epsilon-L-lysinylamide monomer is present in an amount of between about 0.02 and 0.50% by weight.

16. The polymer of claim 14, further comprising one or both of an ultraviolet light-absorbing compound and a blue light-absorbing compound.

17. A biocompatible polymer comprising at least two different monomers, of which one is succinyl-, 2-methylsuccinyl- or 2,3-dimethylsuccinyl-epsilon-L-lysinylamide.

18. The polymer of claim 17 wherein the succinyl-, 2-methylsuccinyl- or 2,3-dimethylsuccinyl-epsilon-L-lysinylamide monomer is present in an amount of between about 0.02 and 0.50% by weight.

19. The polymer of claim 17, further comprising one or both of an ultraviolet light-absorbing compound and a blue light-absorbing compound.

20. A contact lens made from biocompatible polymer of claim 17 or 19, or according to the method of claim 11 or 12.

21. An intraocular lens whose optical or haptic portion is made from a biocompatible polymer of claim 17 or 19, or according to the method of claim 11 or 12.

* * * * *